(12) United States Patent
Gantz, III et al.

(10) Patent No.: US 11,740,888 B2
(45) Date of Patent: Aug. 29, 2023

(54) METHOD AND SYSTEM FOR VERIFICATION OF PATCH INSTALLATION

(71) Applicant: JPMorgan Chase Bank, N.A., New York, NY (US)

(72) Inventors: Rob L Gantz, III, Plain City, OH (US); Brian S Elliott, Worthington, OH (US); Bob Reid, Columbus, OH (US); Kiran Kumar Bodala, Chittoor (IN); Subhashini Gajendran, Chennai (IN); Anubhav Gupta, Bangalore (IN); Sangeetha Varanavasi, Perundurai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/305,884

(22) Filed: Jul. 16, 2021

(65) Prior Publication Data
US 2022/0019421 A1 Jan. 20, 2022

Related U.S. Application Data

(60) Provisional application No. 63/052,656, filed on Jul. 16, 2020.

(51) Int. Cl.
*G06F 8/65* (2018.01)
*G06F 9/451* (2018.01)

(52) U.S. Cl.
CPC ............... *G06F 8/65* (2013.01); *G06F 9/451* (2018.02)

(58) Field of Classification Search
CPC ........................................................ G06F 8/65
See application file for complete search history.

(56) References Cited

U.S. PATENT DOCUMENTS

| | | | | |
|---|---|---|---|---|
| 2005/0160104 A1* | 7/2005 | Meera | ......... | G06F 8/36 |
| 2006/0080656 A1* | 4/2006 | Cain | ......... | G06F 8/65 |
| | | | | 434/118 |
| 2020/0204578 A1* | 6/2020 | Colquhoun | ......... | G06F 8/65 |
| 2021/0264031 A1* | 8/2021 | Dhillon | ......... | G06F 8/65 |

\* cited by examiner

*Primary Examiner* — Duy Khuong T Nguyen
(74) *Attorney, Agent, or Firm* — Greenblum & Bernstein, P.L.C.

(57) ABSTRACT

A system and a method are provided for automating a mainframe patch scanning process for verifying that patches for correcting code deficiencies, bugs, and vulnerabilities have been properly installed across various computer network platforms for tracking and operational continuity purposes. The method includes: receiving a software module; assigning risk attributes to the software module, and determining an operating level agreement based on the risk attributes; deploying the software module to at least one destination within a mainframe computing apparatus environment; and obtaining data indicating whether the deployed software module has been installed in accordance with the operating level agreement, by scanning each mainframe logical partition within which the software module is intended to be installed.

20 Claims, 23 Drawing Sheets

METHOD AND SYSTEM FOR VERIFICATION OF PATCH INSTALLATION

CROSS-REFERENCE TO RELATED APPLICATIONS

This application claims the benefit of U.S. Provisional Patent Application Ser. No. 63/052,656, filed Jul. 16, 2020, which is hereby incorporated by reference in its entirety.

BACKGROUND

1. Field of the Disclosure

This technology generally relates to methods and systems for verifying that software has been installed in computer platforms, and more particularly to methods and systems for automating a mainframe patch scanning process for verifying that patches for correcting code deficiencies, bugs, and vulnerabilities have been properly installed across various computer network environments for tracking and operational continuity purposes.

2. Background Information

A mainframe technology continuously receives critical patches for correcting code deficiencies, bugs, and vulnerabilities within various operating systems and associated technologies. Such patches are often referred to as Program Temporary Fixes (PTFs).

When a PTF is deployed, it is important to verify that the PTF has been installed across all of the network environments to which the PTF is applicable. Conventionally, such a verification has been performed as a manual effort. As a result, the ability to effectively and efficiently track PTF installation Operating Level Agreements (OLAs) that are established based on the fix profile of the PTF has been significantly limited.

Accordingly, there is a need for a tool that automatically determines whether critical software patches and fixes have been installed in environments that use mainframe technology.

SUMMARY

The present disclosure, through one or more of its various aspects, embodiments, and/or specific features or sub-components, provides, inter alia, various systems, servers, devices, methods, media, programs, and platforms for automating a mainframe patch scanning process for verifying that patches for correcting code deficiencies, bugs, and vulnerabilities have been properly installed across various computer network environments for tracking and operational continuity purposes.

According to an aspect of the present disclosure, a method for maintaining software within a mainframe computing apparatus is provided. The method is implemented by at least one processor. The method includes: receiving, by the at least one processor, at least one software module; determining, by the at least one processor based on at least one risk attribute assigned to the received at least one software module, a criticality for the at least one software module; deploying, by the at least one processor, the received at least one software module to at least one destination within the mainframe computing apparatus based on the determined criticality; and obtaining, by the at least one processor, data indicating whether the deployed at least one software module has been installed.

The method may further include: displaying a user interface that includes information that relates to the at least one software module; and after the data indicating whether the at least one software module has been installed is obtained, updating the user interface to include information that indicates an installation status of the at least one software module.

The obtaining of the data may include scanning at least one mainframe logical partition within which the at least one software module is intended to be installed, and determining whether the at least one software module has been installed based on a result of the scanning.

The method may further include: retrieving, based on the determined criticality, an operating level agreement that is applicable to the at least one software module; and determining, based on the retrieved operating level agreement and the result of the scanning, whether the operating level agreement has been violated.

The determining of whether the operating level agreement has been violated may include determining, for each respective one of the at least one mainframe logical partition within which the at least one software module is intended to be installed, whether an installation of the at least one software module has occurred before a corresponding target installation date that is based on the operating level agreement.

The information that indicates the installation status of the at least one software module may be provided as a color-coded cell within a table displayed within the user interface. The table may include a first color indicating a proper installation of the at least one software module, a second color indicating that the at least one software module has not been installed and that the operating level agreement has not been violated, and at least a third color indicating that the at least one software module has not been installed and that the operating level agreement has been violated.

The method may further include: performing, based on a predetermined periodic schedule, a refresh process that includes repeating the obtaining of the data indicating whether the at least one software module has been installed, repeating the updating of the user interface to include the information that indicates the installation status of the at least one software module, and repeating the determining of whether the operating level agreement has been violated; and alerting a user about an updated installation status of the at least one software module based on a result of the refresh process.

The information that indicates the installation status of the at least one software module may include date information indicating a date on which each of the at least one software module was installed.

The method may further include determining, based on a result of the scanning, whether an installation of the at least one software module has caused a program error, and when a determination is made that the program error has been caused, performing an additional scan in order to identify at least one system within the mainframe computing apparatus that is exposed to the program error.

According to another exemplary embodiment, a computing device for maintaining software within a mainframe computing apparatus is provided. The computing apparatus includes a processor; a display; a memory; and a communication interface coupled to each of the processor, the display, and the memory. The processor is configured to: receive, via the communication interface, at least one software module; determine, based on at least one risk attribute assigned to the received at least one software module, a criticality for the at least one software module; deploy the received at least one software module to at least one destination within the mainframe computing apparatus based on the determined criticality; and obtain data indicating whether the deployed at least one software module has been installed.

The processor may be further configured to: cause the display to display a user interface that includes information that relates to the at least one software module; and after the data indicating whether the at least one software module has been installed is obtained, update the user interface to include information that indicates an installation status of the at least one software module.

The processor may be further configured to obtain the data indicating whether the at least one software module has been installed by scanning at least one mainframe logical partition within which the at least one software module is intended to be installed and determining whether the at least one software module has been installed based on a result of the scanning.

The processor may be further configured to: retrieve, based on the determined criticality, an operating level agreement that is applicable to the at least one software module; and determine, based on the retrieved operating level agreement and the result of the scanning, whether the operating level agreement has been violated.

The processor may be further configured to determine whether the operating level agreement has been violated by determining, for each respective one of the at least one mainframe logical partition within which the at least one software module is intended to be installed, whether an installation of the at least one software module has occurred before a corresponding target installation date that is based on the operating level agreement.

The information that indicates the installation status of the at least one software module may be provided as a color-coded cell within a table displayed within the user interface. The table may include a first color indicating a proper installation of the at least one software module, a second color indicating that the at least one software module has not been installed and that the operating level agreement has not been violated, and at least a third color indicating that the at least one software module has not been installed and that the operating level agreement has been violated.

The processor may be further configured to: perform, based on a predetermined periodic schedule, a refresh process that includes repeating the obtaining of the data indicating whether the at least one software module has been installed, repeating the updating of the user interface to include the information that indicates the installation status of the at least one software module, and repeating the determining of whether the operating level agreement has been violated; and alert a user about an updated installation status of the at least one software module based on a result of the refresh process.

The information that indicates the installation status of the at least one software module may include date information indicating a date on which each of the at least one software module was installed.

The processor may be further configured to: determine, based on a result of the scanning, whether an installation of the at least one software module has caused a program error; and when a determination is made that the program error has been caused, perform an additional scan in order to identify at least one system within the mainframe computing apparatus that is exposed to the program error.

According to yet another exemplary embodiment, a non-transitory computer readable storage medium storing instructions for maintaining software within a mainframe computing apparatus is provided. The storage medium includes executable code which, when executed by a processor, causes the processor to: receive at least one software module; determine, based on at least one risk attribute assigned to the received at least one software module, a criticality for the at least one software module; deploy the received at least one software module to at least one destination within the mainframe computing apparatus based on the determined criticality; and obtain data indicating whether the deployed at least one software module has been installed.

The executable code may be further configured to cause the processor to: display a user interface that includes information that relates to the at least one software module; and after the data indicating whether the at least one software module has been installed is obtained, update the user interface to include information that indicates an installation status of the at least one software module.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 19 is a fifth screenshot that illustrates a user interface of a system for automating a mainframe patch scanning process for verifying that patches for correcting code deficiencies, bugs, and vulnerabilities have been properly installed across various computer network environments, according to an exemplary embodiment.

FIG. 23 is a ninth screenshot that illustrates a user interface of a system for automating a mainframe patch scanning process for verifying that patches for correcting code deficiencies, bugs, and vulnerabilities have been properly installed across various computer network environments, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
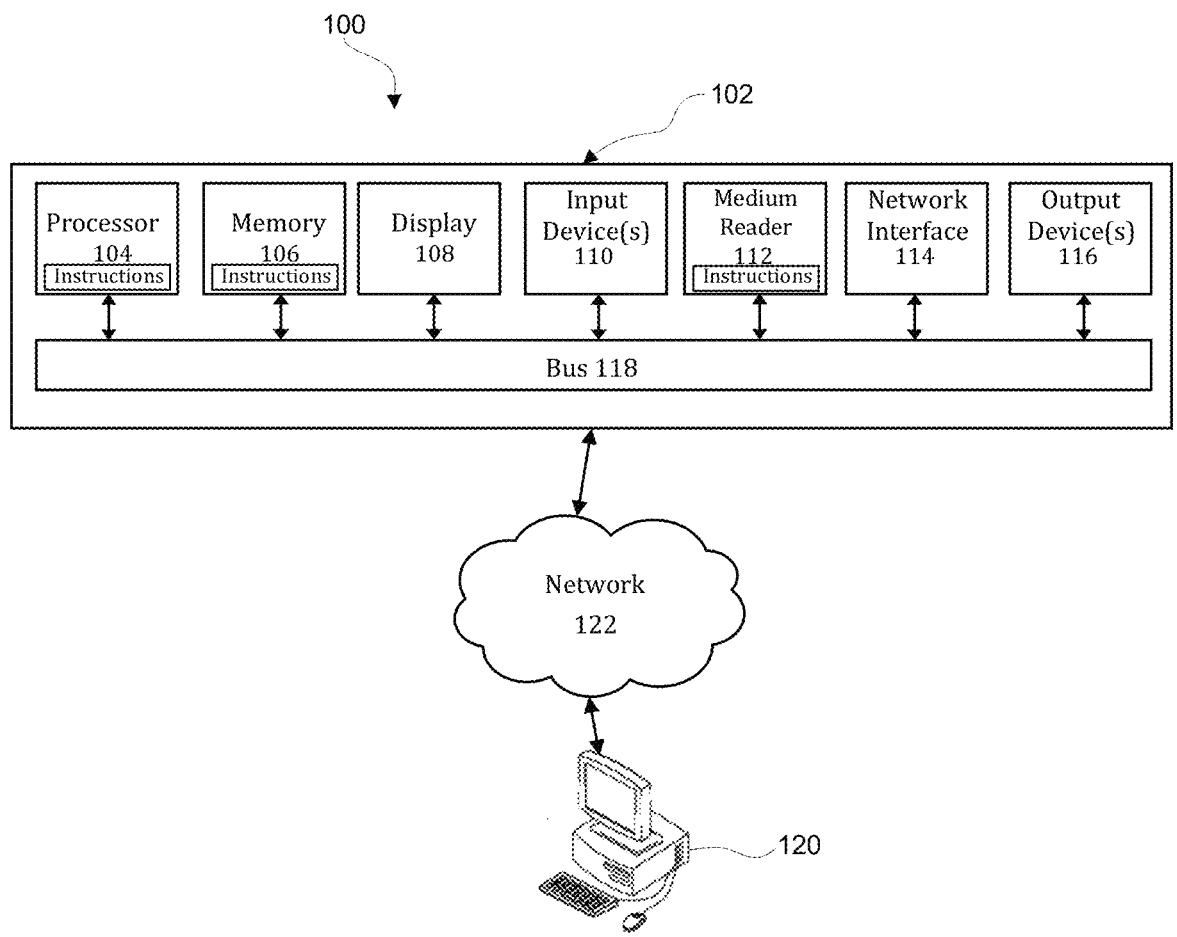
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, a device that is running the Apple iOS operating system, a device that is running the Android operating system, a device that is capable of running a web browser to connect to the Internet, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, a device that is running the Apple iOS operating system, a device that is running the Android operating system, a device that is capable of running a web browser to connect to the Internet, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automating a mainframe patch scanning process for verifying that patches for correcting code deficiencies, bugs, and vulnerabilities have been properly installed across various computer network environments for tracking and operational continuity purposes.

Figure 2:
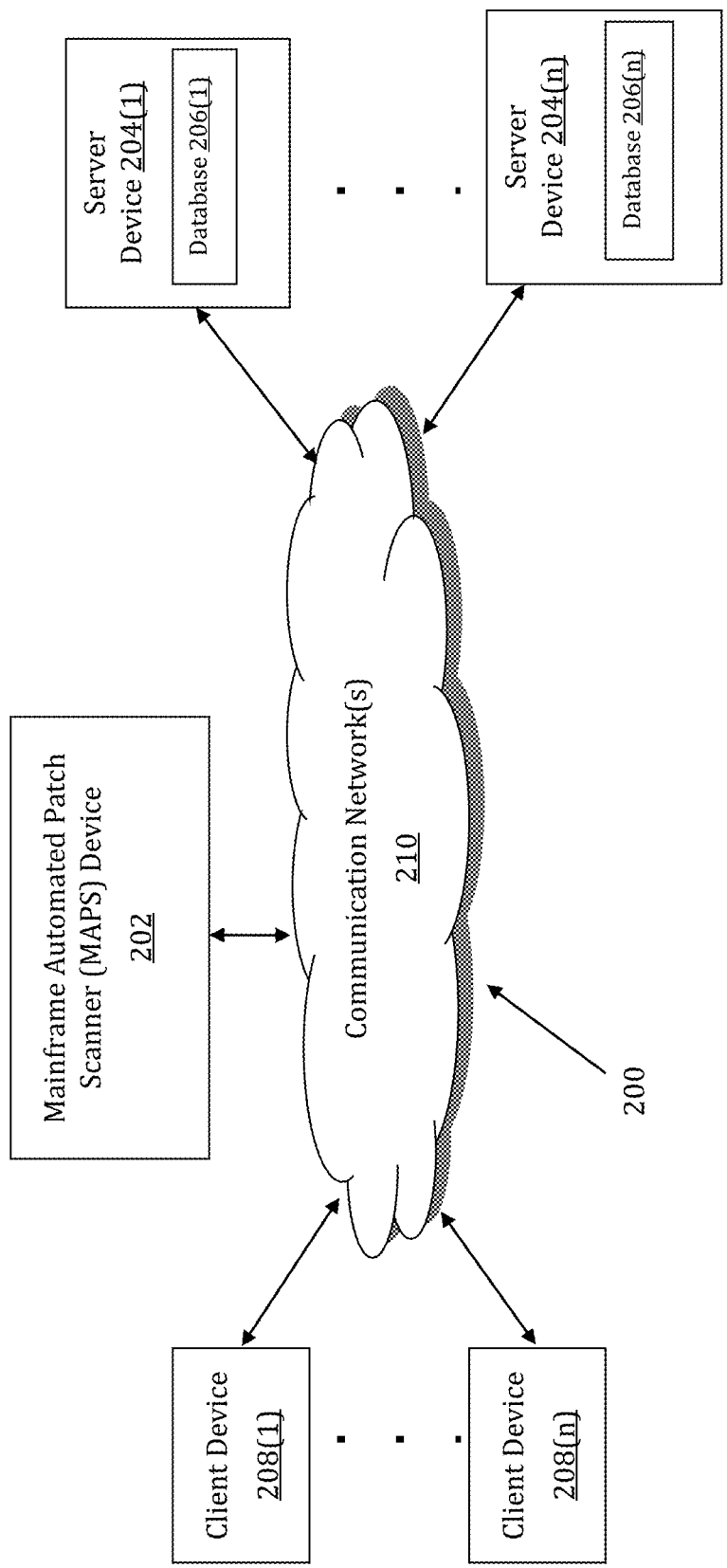
FIG. 2 illustrates an exemplary diagram of a network environment.

Referring to FIG. 2, a schematic of an exemplary network environment 200 for implementing a method for automating a mainframe patch scanning process for verifying that patches for correcting code deficiencies, bugs, and vulnerabilities have been properly installed across various computer network environments is illustrated. In an exemplary embodiment, the method is executable on any networked computer platform, such as, for example, a personal computer (PC), a device that is running the Apple iOS operating system, a device that is running the Android operating system, or a device that is capable of running a web browser to connect to the Internet.

The method for automating a mainframe patch scanning process for verifying that patches for correcting code deficiencies, bugs, and vulnerabilities have been properly installed across various computer network environments may be implemented by a Mainframe Automated Patch Scanner (MAPS) device 202. The MAPS device 202 may be the same or similar to the computer system 102 as described with respect to FIG. 1. The MAPS device 202 may store one or more applications that can include executable instructions that, when executed by the MAPS device 202, cause the MAPS device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MAPS device 202 itself, may be located in virtual server(s) running in a cloud-based computing environment rather than being tied to one or more specific physical network computing devices. Also, the application(s) may be running in one or more virtual machines (VMs) executing on the MAPS device 202. Additionally, in one or more embodiments of this technology, virtual machine(s) running on the MAPS device 202 may be managed or supervised by a hypervisor.

In the network environment 200 of FIG. 2, the MAPS device 202 is coupled to a plurality of server devices 204(1)-204(n) that hosts a plurality of databases 206(1)-206(n), and also to a plurality of client devices 208(1)-208(n) via communication network(s) 210. A communication interface of the MAPS device 202, such as the network interface 114 of the computer system 102 of FIG. 1, operatively couples and communicates between the MAPS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MAPS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and MAPS devices that efficiently implement methods and systems for automating a mainframe patch scanning process for verifying that patches for correcting code deficiencies, bugs, and vulnerabilities have been properly installed across various computer network environments.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MAPS device 202 may be a standalone device or integrated with one or more other devices or apparatuses, such as one or more of the server devices 204(1)-204(n), for example. In one particular example, the MAPS device 202 may include or be hosted by one of the server devices 204(1)-204(n), and other arrangements are also possible. Moreover, one or more of the devices of the MAPS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MAPS device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to operating systems that use applications requiring software patches and fixes, status information that relates to installation of software patches and fixes, and computer networks and workstations to which software patches and fixes are deployed and installed.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the MAPS device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the MAPS device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the MAPS device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MAPS device 202, the server devices 204(1)-204(n), or the client devices 208(1)-208(n), for example, may be configured to operate as virtual instances on the same physical machine. In other words, one or more of the MAPS device 202, the server devices 204(1)-204(n), or the client devices 208(1)-208(n) may operate on the same physical device rather than as separate devices communicating through communication network(s) 210. Additionally, there may be more or fewer MAPS devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
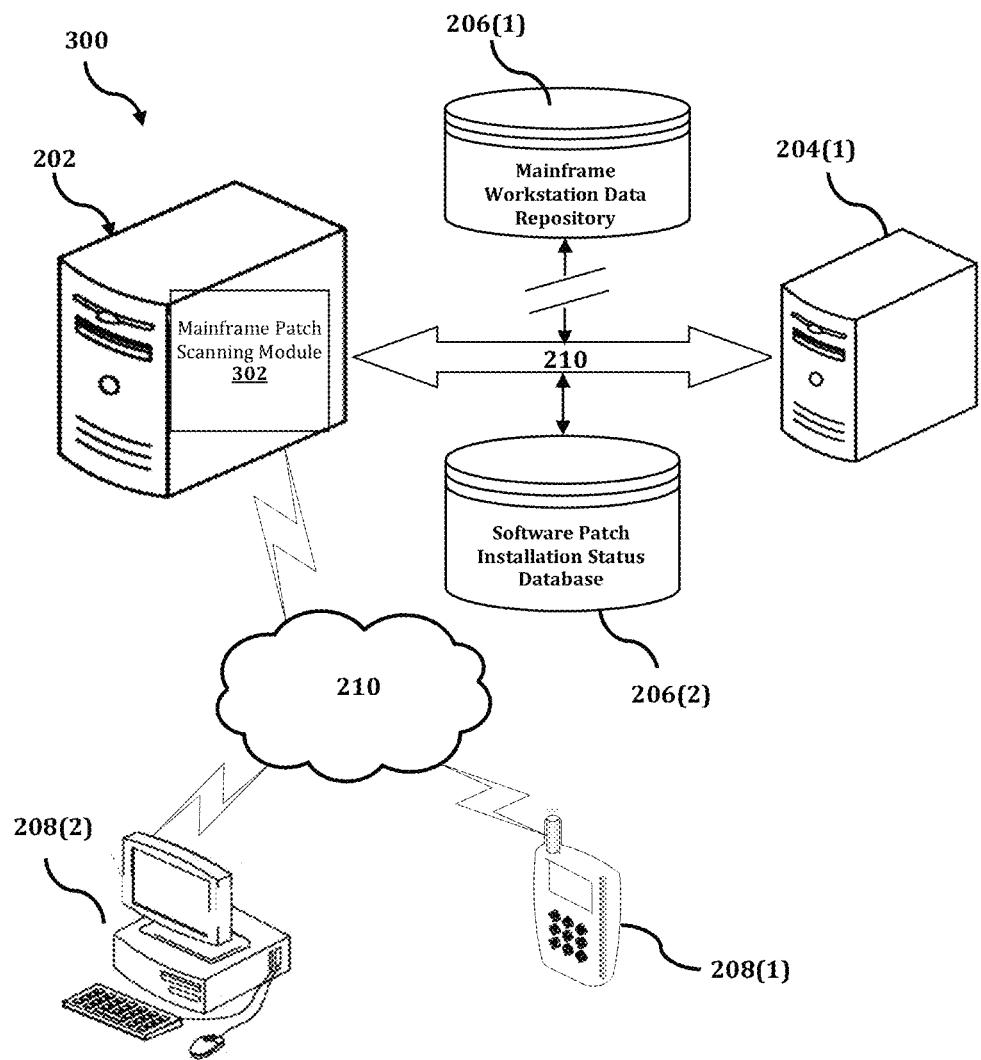
FIG. 3 shows an exemplary system for implementing a method for automating a mainframe patch scanning process for verifying that patches for correcting code deficiencies, bugs, and vulnerabilities have been properly installed across various computer network environments for tracking and operational continuity purposes.

The MAPS device 202 is described and illustrated in FIG. 3 as including a mainframe patch scanning module 302, although it may include other rules, policies, modules, databases, or applications, for example. As will be described below, the mainframe patch scanning module 302 is configured to implement a method for automating a mainframe patch scanning process for verifying that patches for correcting code deficiencies, bugs, and vulnerabilities have been properly installed across various computer network environments for tracking and operational continuity purposes.

An exemplary process 300 for implementing a mechanism for automating a mainframe patch scanning process for verifying that patches for correcting code deficiencies, bugs, and vulnerabilities have been properly installed across various computer network environments by utilizing the network environment of FIG. 2 is illustrated as being executed in FIG. 3. Specifically, a first client device 208(1) and a second client device 208(2) are illustrated as being in communication with MAPS device 202. In this regard, the first client device 208(1) and the second client device 208(2) may be "clients" of the MAPS device 202 and are described herein as such. Nevertheless, it is to be known and understood that the first client device 208(1) and/or the second client device 208(2) need not necessarily be "clients" of the MAPS device 202, or any entity described in association therewith herein.

Any additional or alternative relationship may exist between either or both of the first client device 208(1) and the second client device 208(2) and the MAPS device 202, or no relationship may exist. For example, the MAPS device 202 and the first client device 208(1) may be configured as the same physical device.

Further, MAPS device 202 is illustrated as being able to access a mainframe workstation data repository 206(1) and a software patch installation status database 206(2). The mainframe patch scanning module 302 may be configured to access these databases for implementing a method for automating a mainframe patch scanning process for verifying that patches for correcting code deficiencies, bugs, and vulnerabilities have been properly installed across various computer network environments for tracking and operational continuity purposes.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the MAPS device 202 via broadband or cellular communication. Alternatively, the process may be executed by the MAPS device 202 in a standalone manner, e.g., by a smart phone on which the interaction services routing and handling module 302 has been downloaded. Of course, these embodiments are merely exemplary and are not limiting or exhaustive.

Upon being started, a processor that is hosted in the MAPS device 202 executes a process for automating a mainframe patch scanning process for verifying that patches for correcting code deficiencies, bugs, and vulnerabilities have been properly installed across various computer network environments. An exemplary process for automating a mainframe patch scanning process for verifying that patches for correcting code deficiencies, bugs, and vulnerabilities have been properly installed across various computer network environments is generally indicated at flowchart 400 in FIG. 4.

Figure 4:
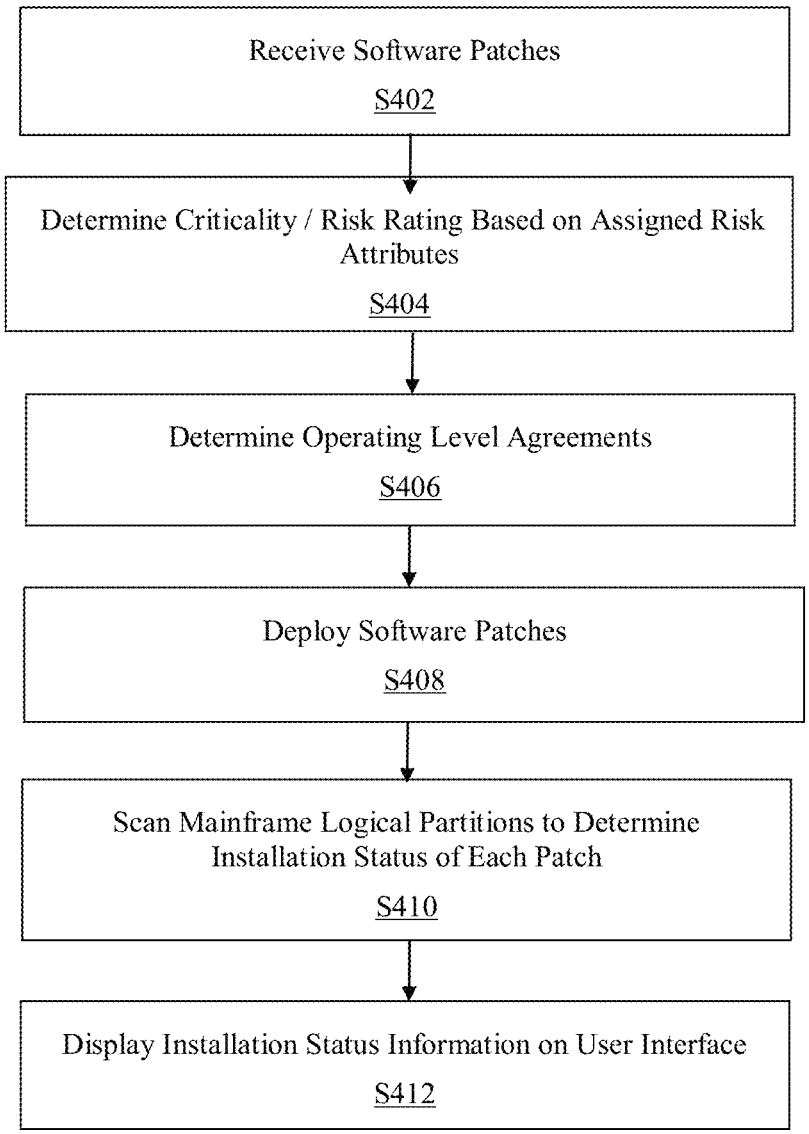
FIG. 4 is a flowchart of an exemplary method for automating a mainframe patch scanning process for verifying that patches for correcting code deficiencies, bugs, and vulnerabilities have been properly installed across various computer network environments for tracking and operational continuity purposes.

In process 400 of FIG. 4, at step S402, the mainframe patch scanning module 302 receives a set of software patches (also referred to herein as "software modules") that are designed to correct code deficiencies, bugs, and vulnerabilities within the operating systems and associated technologies of a mainframe software architecture. In an exemplary embodiment, the mainframe patch scanning module 302 is continuously ingesting software patches, also referred to herein as Program Temporary Fixes (PTFs), which are often provided by vendors.

At step S404, the mainframe patch scanning module 302 determines a criticality, also referred to herein as a risk rating, for each software patch. In an exemplary embodiment, for each PTF, the vendor has assigned risk attributes to the PTF, and the risk attributes are then used to determine the risk rating of the PTF. Then, at step S406, the risk rating is used to determine an applicable operating level agreement (OLA) to be assigned to the PTF.

At step S408, the software patches are deployed across various environments within the mainframe infrastructure for installation. In an exemplary embodiment, the deployment of each PTF effectively initiates a process of installing the PTF on all applicable logical partitions within the mainframe infrastructure.

At step S410, the mainframe patch scanning module 302 scans each mainframe logical partition in order to determine whether or not a particular PTF has been installed. In an exemplary embodiment, each PTF includes metadata that includes a unique identifier for the PTF, and the scan is designed to check whether or not the unique identifier is present in order to determine the installation status of the PTF.

At step S412, a result of the scan is transmitted to a dashboard of a graphical user interface (GUI), which displays the scan results as installation status information. In an exemplary embodiment, the results are displayed as color-coded cells within a table. A first color may indicate a successful installation; a second color may indicate that the software patch has not yet been installed, but that the OLA has not been violated; and a third color may indicate that the software patch has not been installed and the OLA has been violated. The dashboard may also include date information indicating when each software patch was installed.

The scan results may also indicate that the installation of a PTF has caused a secondary error, which may be referred to as a Program Error (PE). In this circumstance, the mainframe patch scanning module 302 may perform an additional scan in order to identify systems and environments that are exposed to the error.

Figure 5:
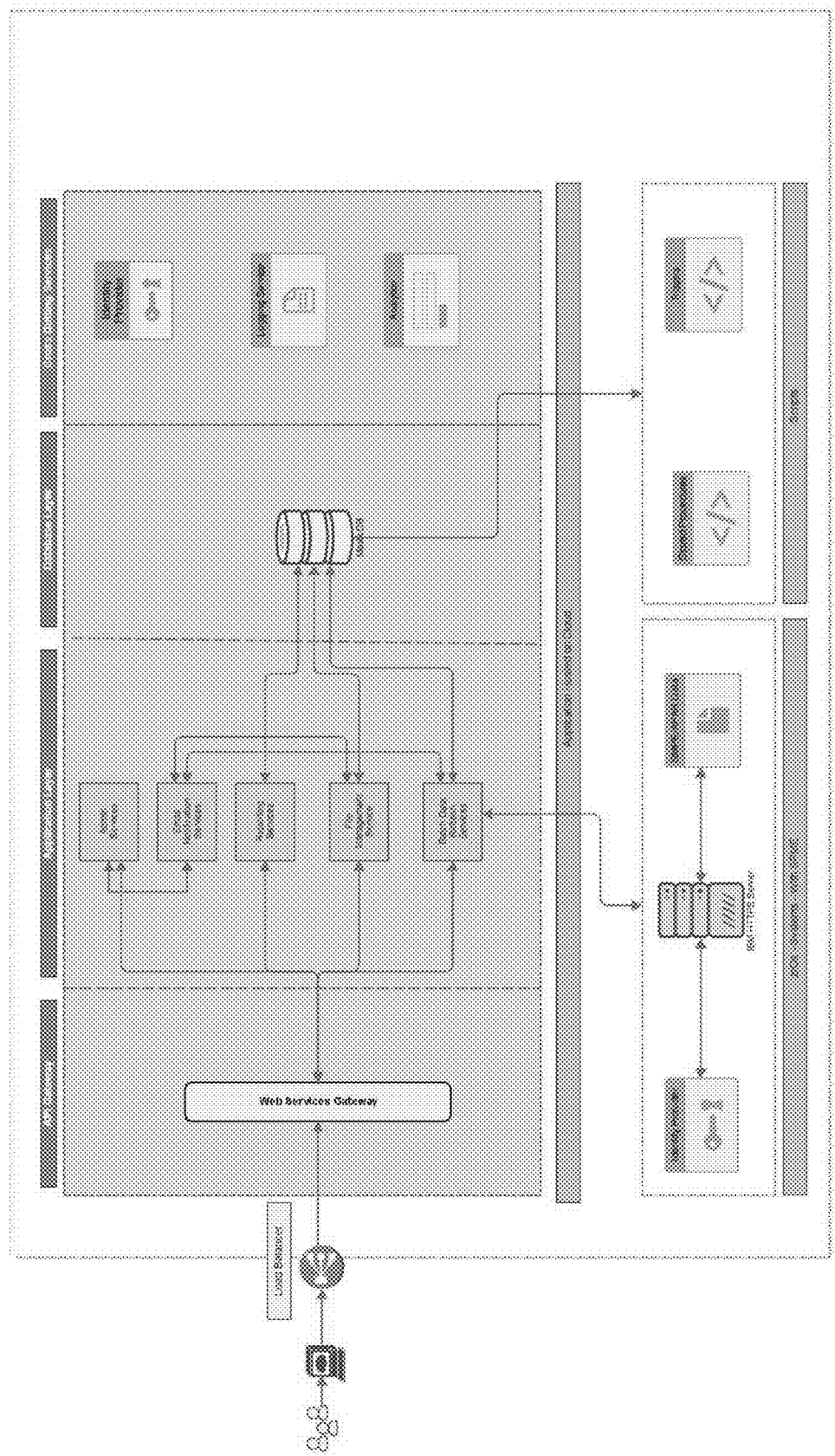
FIG. 5 is an architectural diagram of a system for automating a mainframe patch scanning process for verifying that patches for correcting code deficiencies, bugs, and vulnerabilities have been properly installed across various computer network environments, according to an exemplary embodiment.

FIG. 5 is an architectural diagram 500 of a system for automating a mainframe patch scanning process for verifying that patches for correcting code deficiencies, bugs, and vulnerabilities have been properly installed across various computer network environments, according to an exemplary embodiment. As illustrated in architectural diagram 500, users of an application that is hosted on a cloud may access the application via a load balancer and an application programming interface (API) gateway layer that includes a web services gateway module. The web services gateway communicates with an application layer that includes an administrative services module, an email notification services module, a reporting services module, a file management services module, and a batch data refresh services module. The modules of the application layer are in communication with a database layer that includes various databases, and also with a System Modification Program Extended (SMPE) server that has access to an identity provider module and an SMPE database that stores Authorized Program Analysis Report (APAR) data. The architecture also has a cross cutting services layer that includes an identity provider module, a logging service module, and an analytics module.

Figure 6:
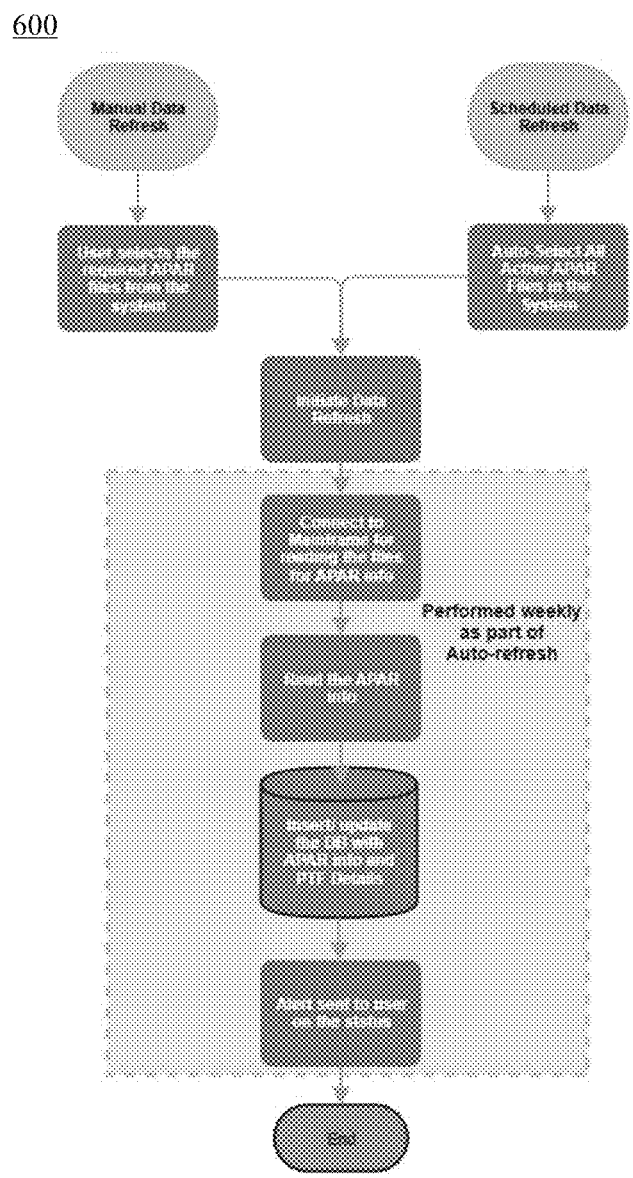
FIG. 6 is a flowchart of a data refresh process that is used in connection with a method for automating a mainframe patch scanning process for verifying that patches for correcting code deficiencies, bugs, and vulnerabilities have been properly installed across various computer network environments, according to an exemplary embodiment.

FIG. 6 is a flowchart 600 of a data refresh process that is used in connection with a method for automating a mainframe patch scanning process for verifying that patches for correcting code deficiencies, bugs, and vulnerabilities have been properly installed across various computer network environments, according to an exemplary embodiment. The method 600 may be initiated either manually or as a scheduled data refresh. For the manual data refresh, a user selects specific APAR files, whereas for the scheduled data refresh, all active APAR files are automatically selected. Both types of data refresh are then merged in to a data refresh process that is initiated. The process includes: connecting to the mainframe infrastructure for reading the files for APAR information; reading the APAR information; updating the relevant databases with the APAR information and the PTF details, including the installation status of the PTF; and sending an alert regarding the status to a user. In an exemplary embodiment, the scheduled data refresh may be performed automatically on a periodic basis, such as, for example, once per week.

Figure 7:
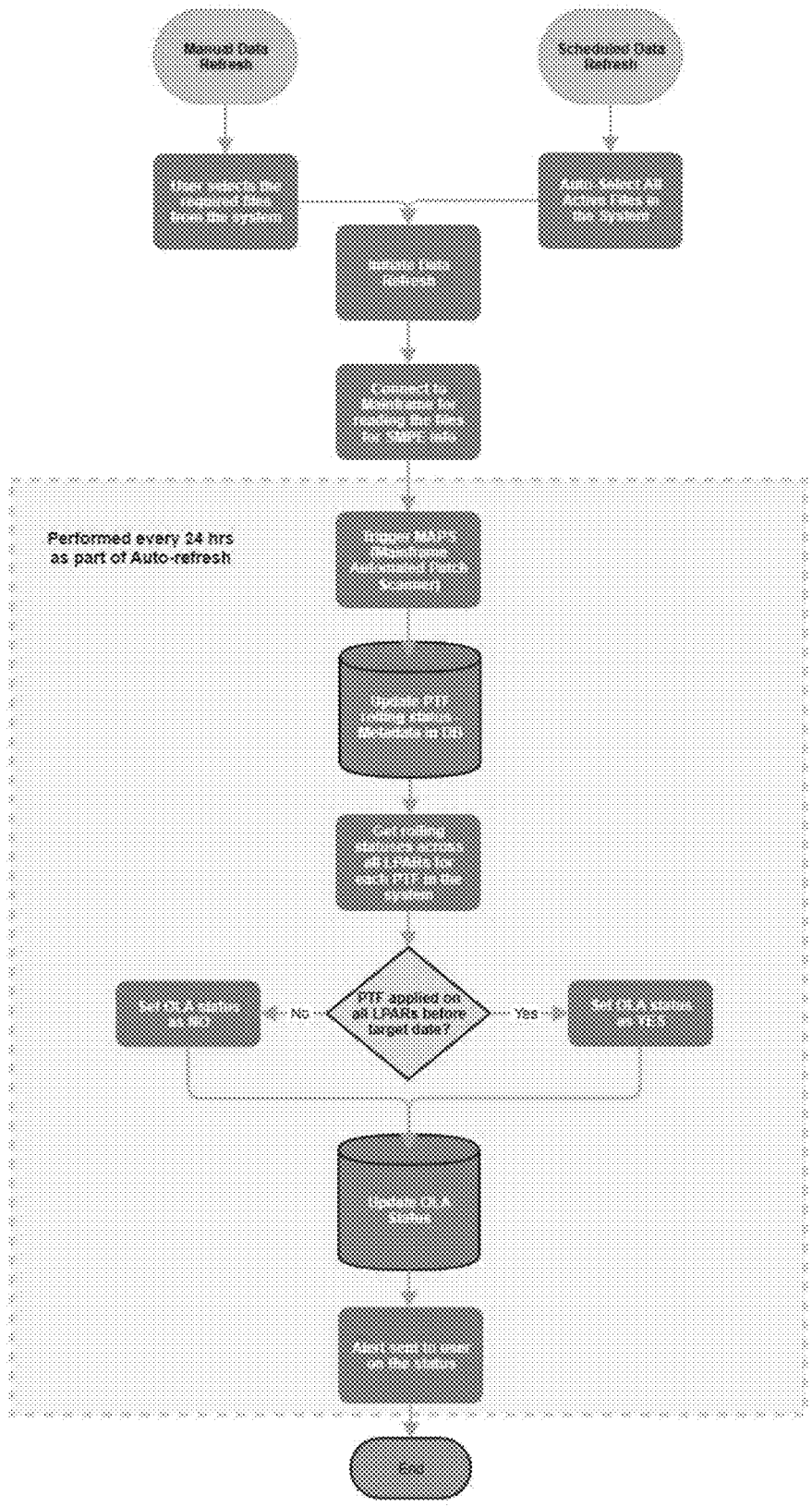
FIG. 7 is a flowchart of a modified data refresh process that is used in connection with a method for automating a mainframe patch scanning process for verifying that patches for correcting code deficiencies, bugs, and vulnerabilities have been properly installed across various computer network environments, according to another exemplary embodiment.

FIG. 7 is a flowchart 700 of a modified data refresh process that is used in connection with a method for automating a mainframe patch scanning process for verifying that patches for correcting code deficiencies, bugs, and vulnerabilities have been properly installed across various computer network environments, according to another exemplary embodiment. The method 700 includes many of the same steps as the method 600, with the following modifications and additions: The connection to the mainframe also enables the reading of the files for SMPE information. After the data refresh is initiated, the mainframe automated patch scanner (MAPS) application is triggered. In an exemplary embodiment, MAPS includes the mainframe patch scanning module 302. After MAPS is triggered, all logical partitions (LPARs) are scanned in order to determine a status of each PTF in the system. A determination is then made as to whether each PTF has been applied on all LPARs before a respective target date that is based on the corresponding OLA, and the OLA status is set as either YES or NO based on this determination. The user is then alerted re the status.

Figure 8:
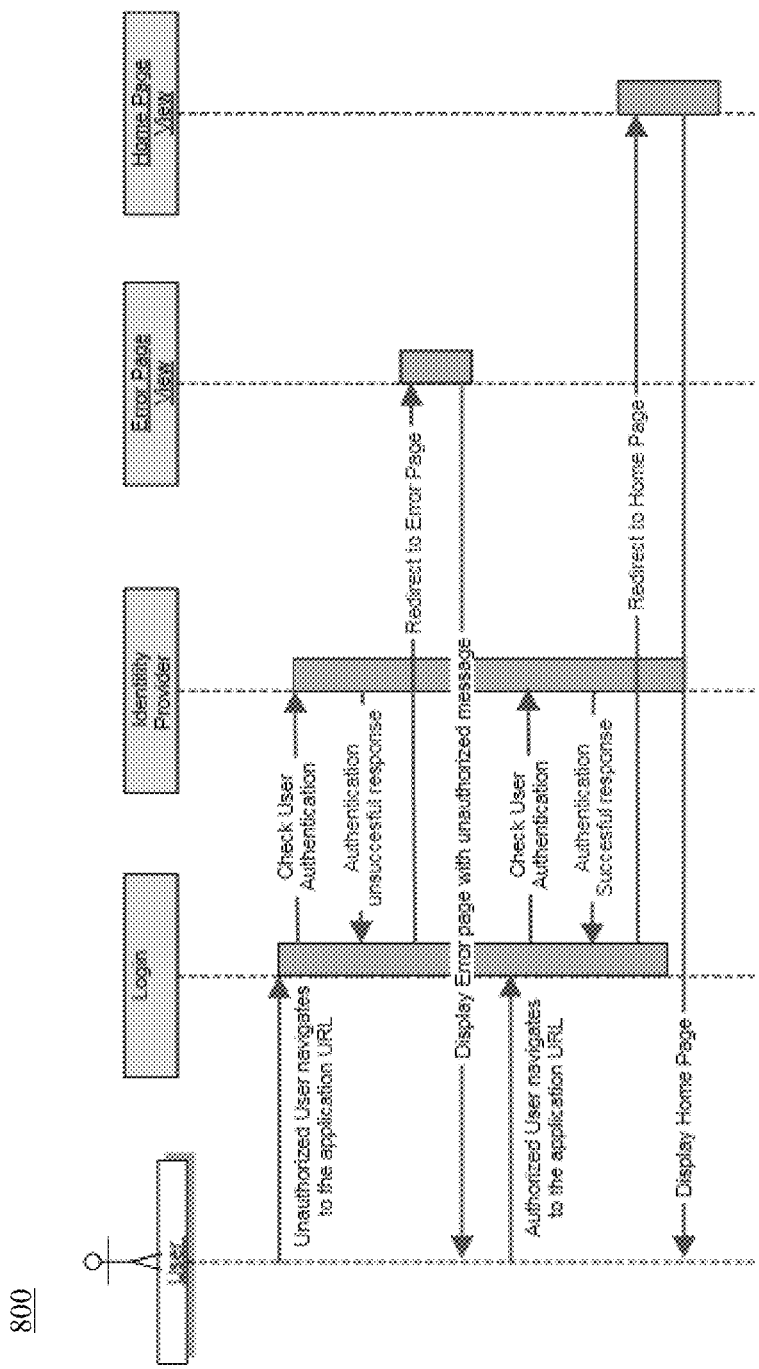
FIG. 8 is a transactional diagram that illustrates a first set of data flows in an implementation of a method for automating a mainframe patch scanning process for verifying that patches for correcting code deficiencies, bugs, and vulnerabilities have been properly installed across various computer network environments, according to an exemplary embodiment.

FIG. 8 is a transactional diagram 800 that illustrates a first set of data flows in an implementation of a method for automating a mainframe patch scanning process for verifying that patches for correcting code deficiencies, bugs, and vulnerabilities have been properly installed across various computer network environments, according to an exemplary embodiment. The diagram 800 shows a transactional sequence for a login and landing page.

Figure 9:
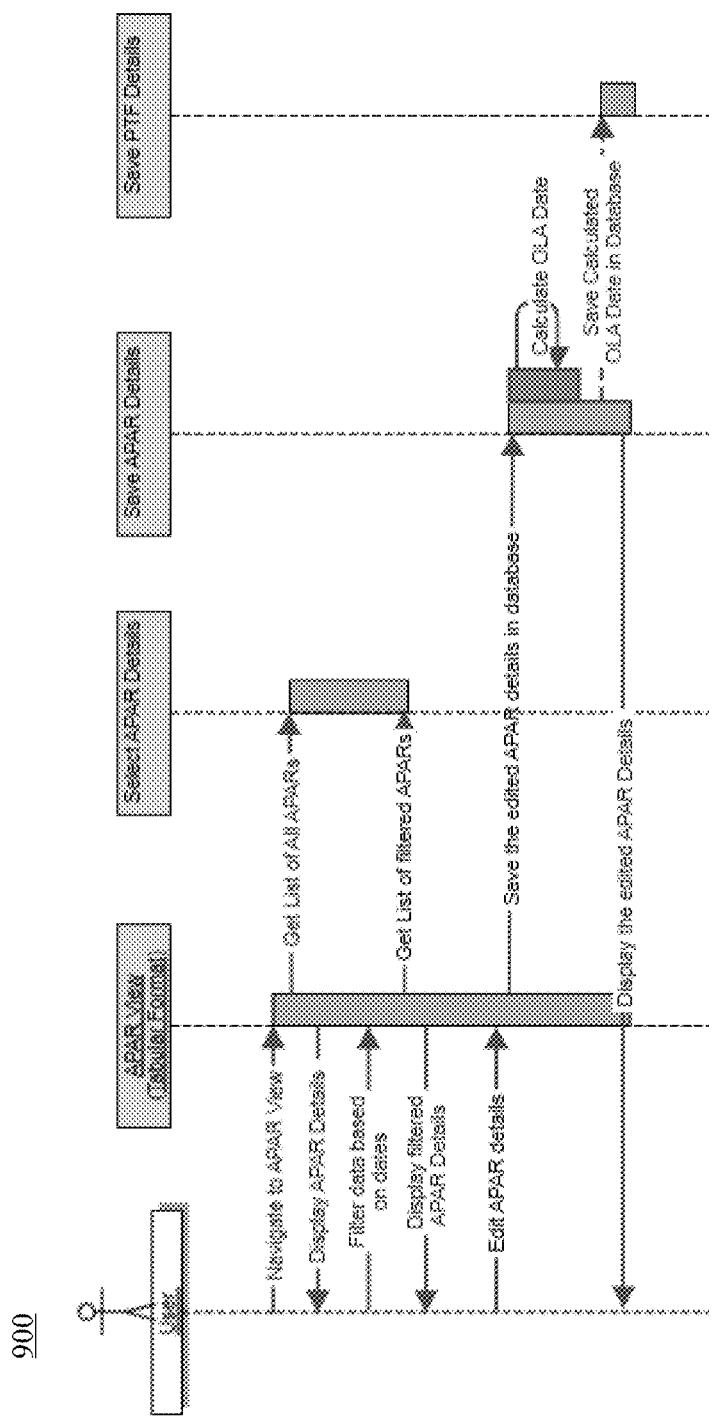
FIG. 9 is a transactional diagram that illustrates a second set of data flows in an implementation of a method for automating a mainframe patch scanning process for verifying that patches for correcting code deficiencies, bugs, and vulnerabilities have been properly installed across various computer network environments, according to an exemplary embodiment.

FIG. 9 is a transactional diagram 900 that illustrates a second set of data flows in an implementation of a method for automating a mainframe patch scanning process for verifying that patches for correcting code deficiencies, bugs, and vulnerabilities have been properly installed across various computer network environments, according to an exemplary embodiment. The diagram 900 shows a transactional sequence for an APAR view.

Figure 10:
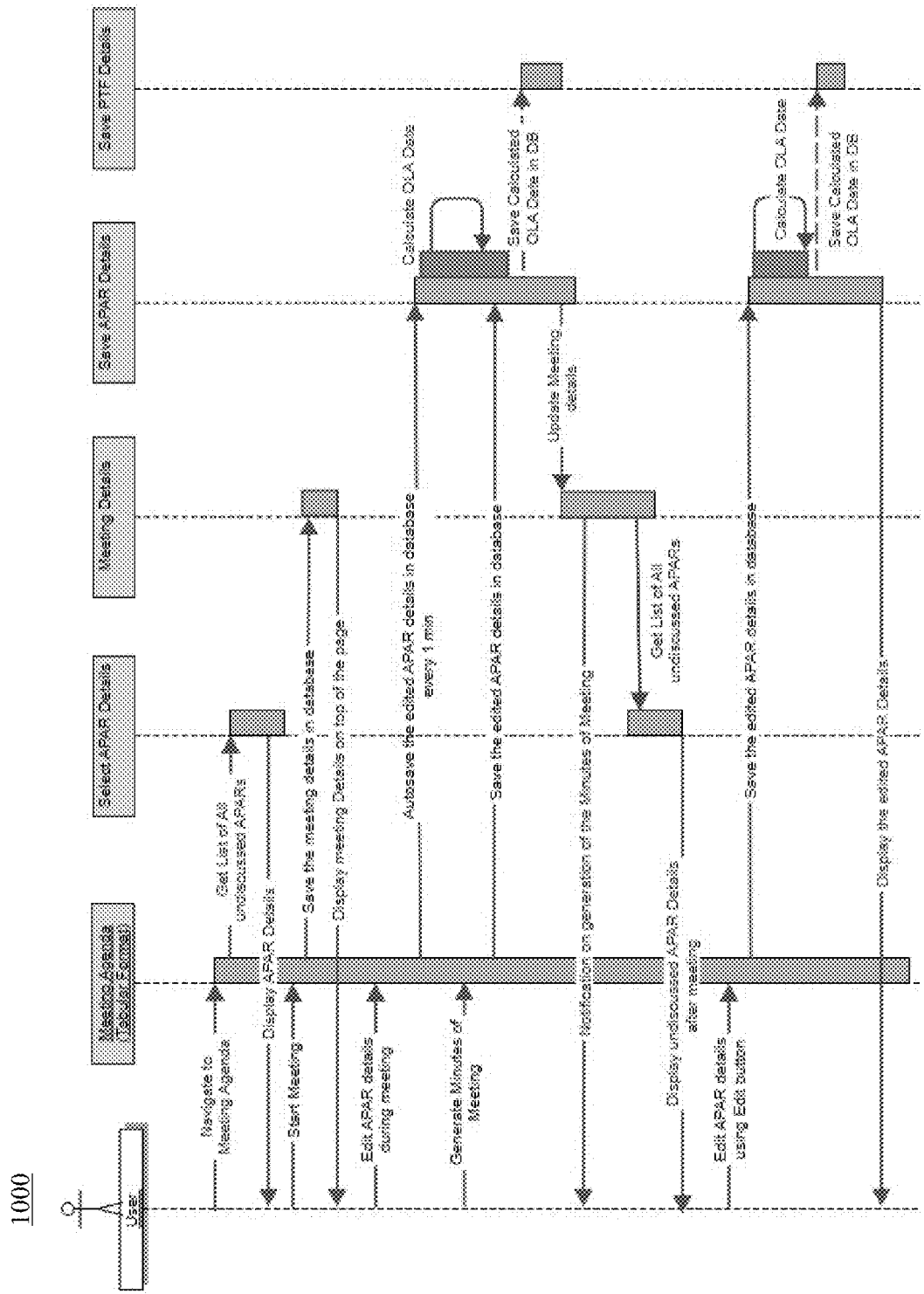
FIG. 10 is a transactional diagram that illustrates a third set of data flows in an implementation of a method for automating a mainframe patch scanning process for verifying that patches for correcting code deficiencies, bugs, and vulnerabilities have been properly installed across various computer network environments, according to an exemplary embodiment.

FIG. 10 is a transactional diagram 1000 that illustrates a third set of data flows in an implementation of a method for automating a mainframe patch scanning process for verifying that patches for correcting code deficiencies, bugs, and vulnerabilities have been properly installed across various computer network environments, according to an exemplary embodiment. The diagram 1000 shows a transactional sequence for a meeting agenda.

Figure 11:
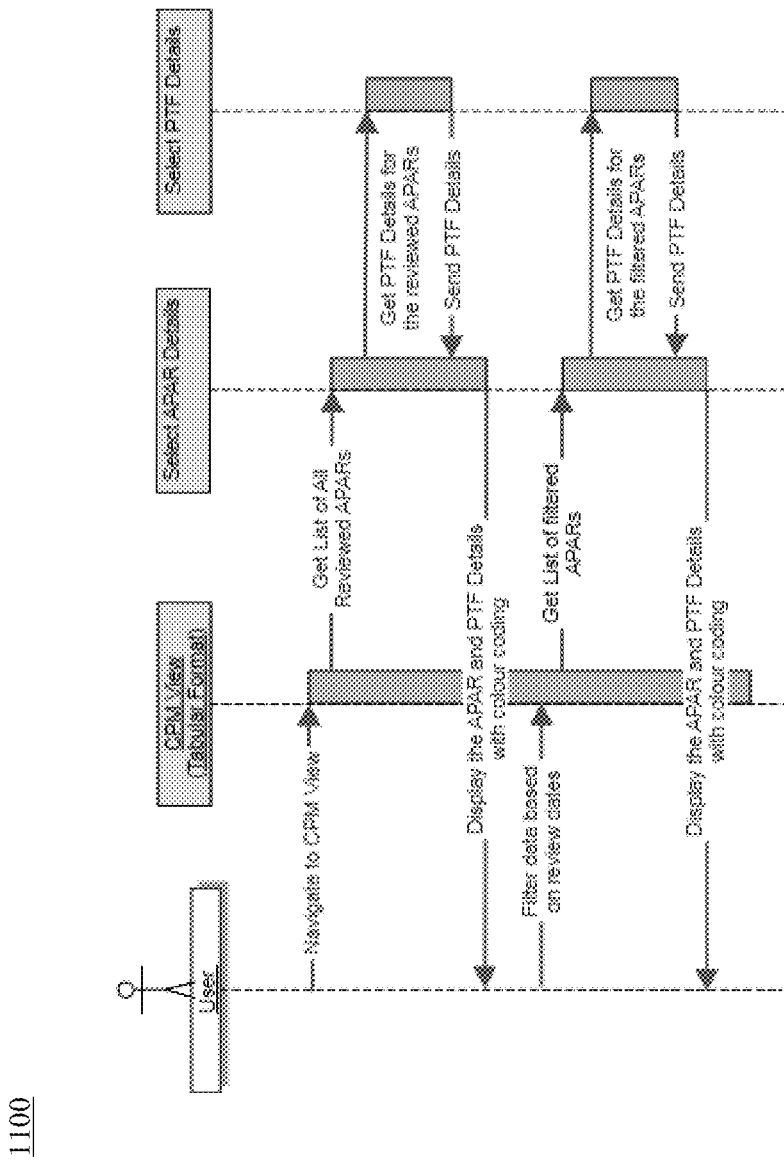
FIG. 11 is a transactional diagram that illustrates a fourth set of data flows in an implementation of a method for automating a mainframe patch scanning process for verifying that patches for correcting code deficiencies, bugs, and vulnerabilities have been properly installed across various computer network environments, according to an exemplary embodiment.

FIG. 11 is a transactional diagram 1100 that illustrates a fourth set of data flows in an implementation of a method for automating a mainframe patch scanning process for verifying that patches for correcting code deficiencies, bugs, and vulnerabilities have been properly installed across various computer network environments, according to an exemplary embodiment. The diagram 1100 shows a transactional sequence for a critical patch management (CPM) view.

Figure 12:
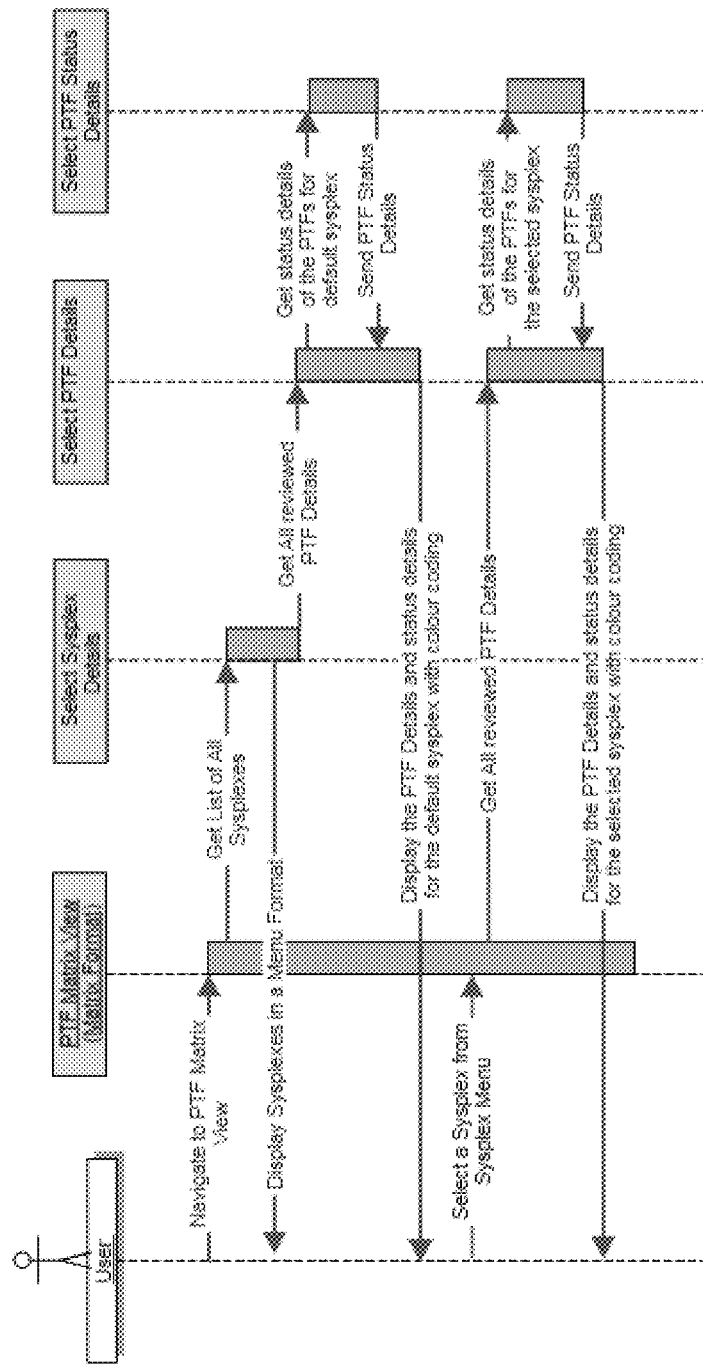
FIG. 12 is a transactional diagram that illustrates a fifth set of data flows in an implementation of a method for automating a mainframe patch scanning process for verifying that patches for correcting code deficiencies, bugs, and vulnerabilities have been properly installed across various computer network environments, according to an exemplary embodiment.

FIG. 12 is a transactional diagram 1200 that illustrates a fifth set of data flows in an implementation of a method for automating a mainframe patch scanning process for verifying that patches for correcting code deficiencies, bugs, and vulnerabilities have been properly installed across various computer network environments, according to an exemplary embodiment. The diagram 1200 shows a transactional sequence for a PTF matrix view.

Figure 13:
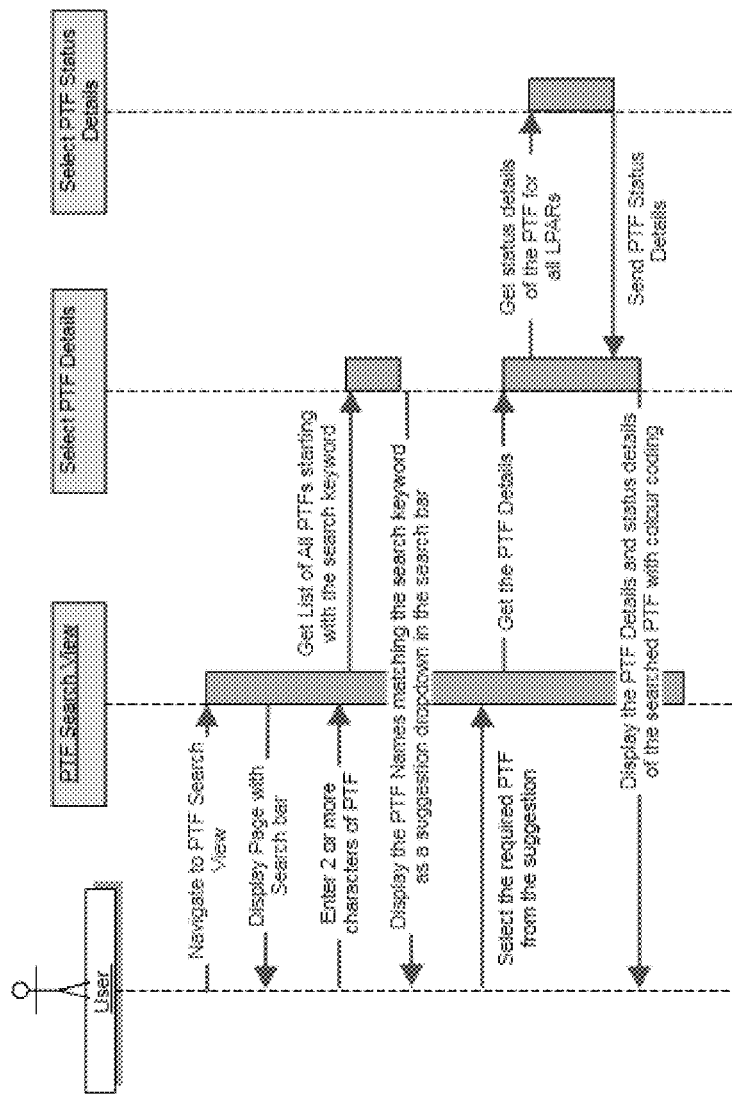
FIG. 13 is a transactional diagram that illustrates a sixth set of data flows in an implementation of a method for automating a mainframe patch scanning process for verifying that patches for correcting code deficiencies, bugs, and vulnerabilities have been properly installed across various computer network environments, according to an exemplary embodiment.

FIG. 13 is a transactional diagram 1300 that illustrates a sixth set of data flows in an implementation of a method for automating a mainframe patch scanning process for verifying that patches for correcting code deficiencies, bugs, and vulnerabilities have been properly installed across various computer network environments, according to an exemplary embodiment. The diagram 1300 shows a transactional sequence for a PTF search view.

Figure 14:
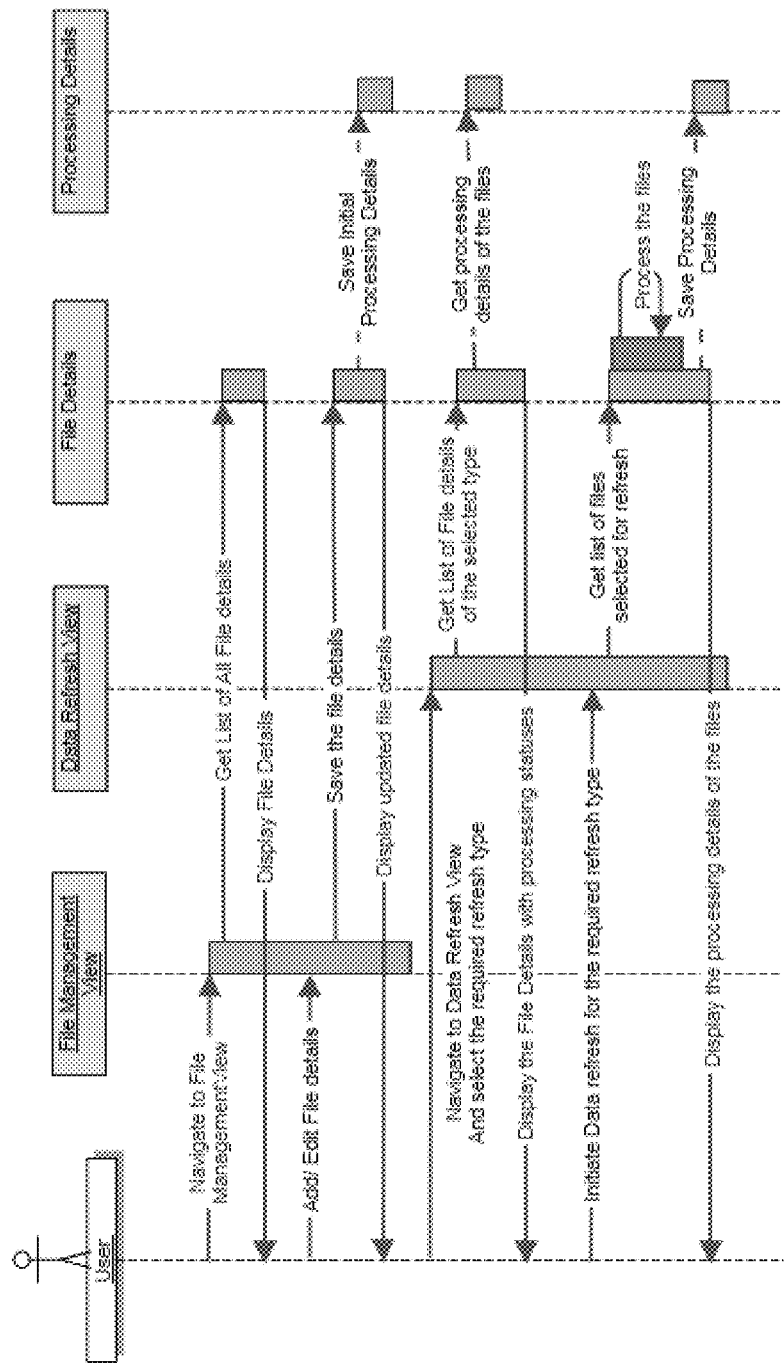
FIG. 14 is a transactional diagram that illustrates a seventh set of data flows in an implementation of a method for automating a mainframe patch scanning process for verifying that patches for correcting code deficiencies, bugs, and vulnerabilities have been properly installed across various computer network environments, according to an exemplary embodiment.

FIG. 14 is a transactional diagram 1400 that illustrates a seventh set of data flows in an implementation of a method for automating a mainframe patch scanning process for verifying that patches for correcting code deficiencies, bugs, and vulnerabilities have been properly installed across various computer network environments, according to an exemplary embodiment. The diagram 1400 shows a transactional sequence for a file management and data refresh process.

Figure 15:
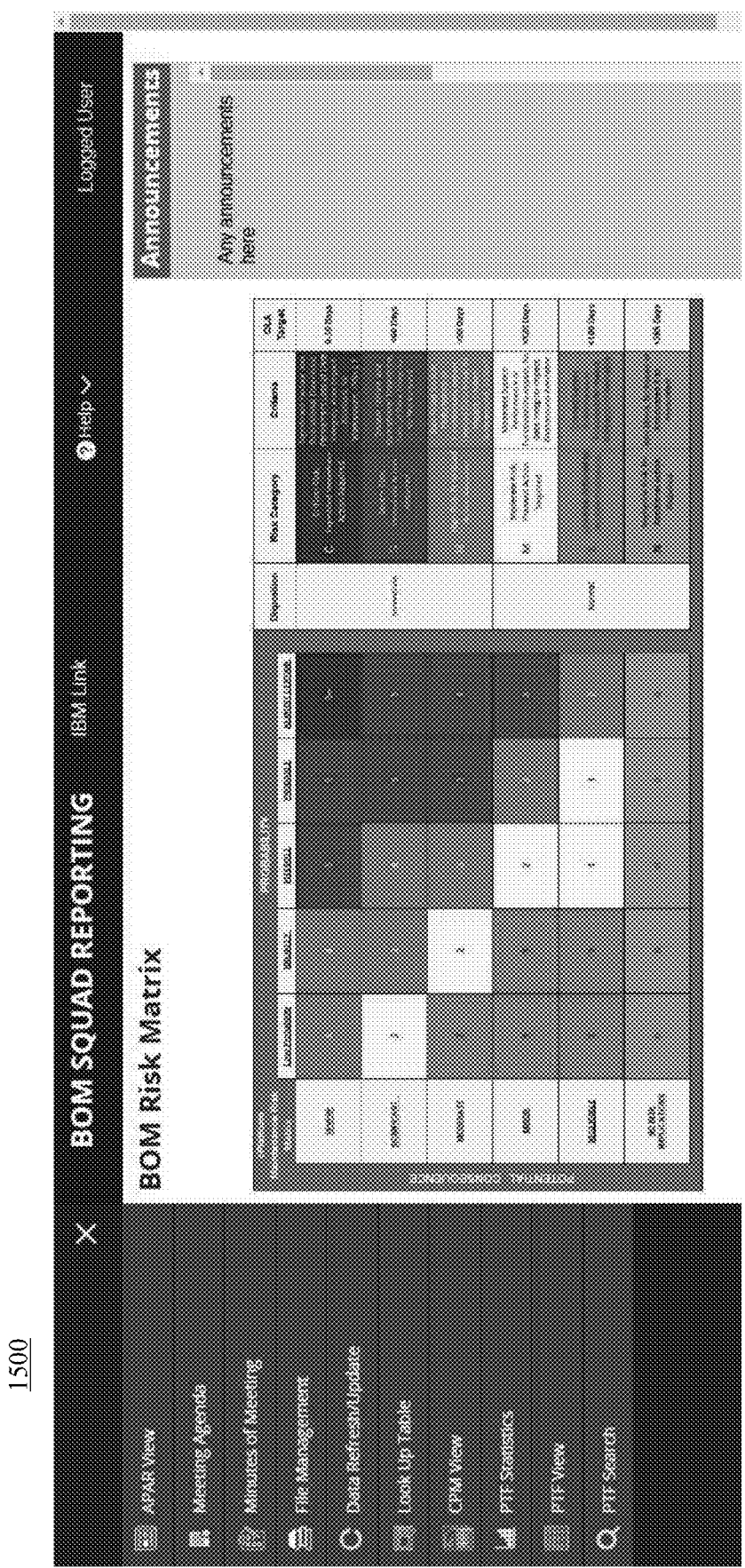
FIG. 15 is a first screenshot that illustrates a user interface of a system for automating a mainframe patch scanning process for verifying that patches for correcting code deficiencies, bugs, and vulnerabilities have been properly installed across various computer network environments, according to an exemplary embodiment.

FIG. 15 is a first screenshot 1500 that illustrates a user interface of a system for automating a mainframe patch scanning process for verifying that patches for correcting code deficiencies, bugs, and vulnerabilities have been properly installed across various computer network environments, according to an exemplary embodiment. Screenshot 1500 illustrates a home page for a GUI provided by the MAPS application. Once a user is authenticated, the web application displays the home page, which includes a risk matrix and announcements, together with a top menu bar and a side navigation pane.

Figure 16:
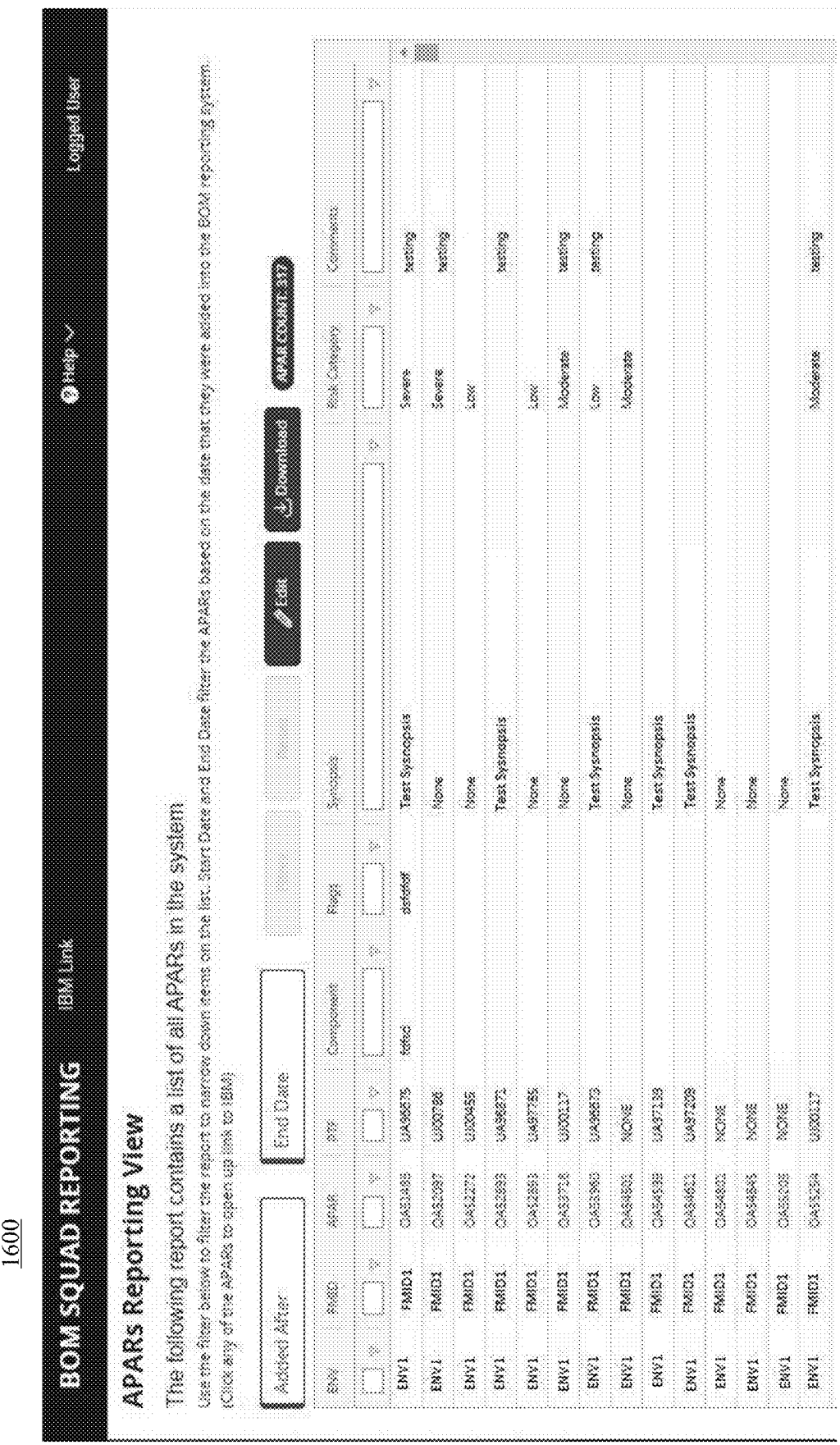
FIG. 16 is a second screenshot that illustrates a user interface of a system for automating a mainframe patch scanning process for verifying that patches for correcting code deficiencies, bugs, and vulnerabilities have been properly installed across various computer network environments, according to an exemplary embodiment.

FIG. 16 is a second screenshot 1600 that illustrates a user interface of a system for automating a mainframe patch scanning process for verifying that patches for correcting code deficiencies, bugs, and vulnerabilities have been properly installed across various computer network environments, according to an exemplary embodiment. Screenshot 1600 illustrates an APAR reporting view which displays details of APARs.

Figure 17:
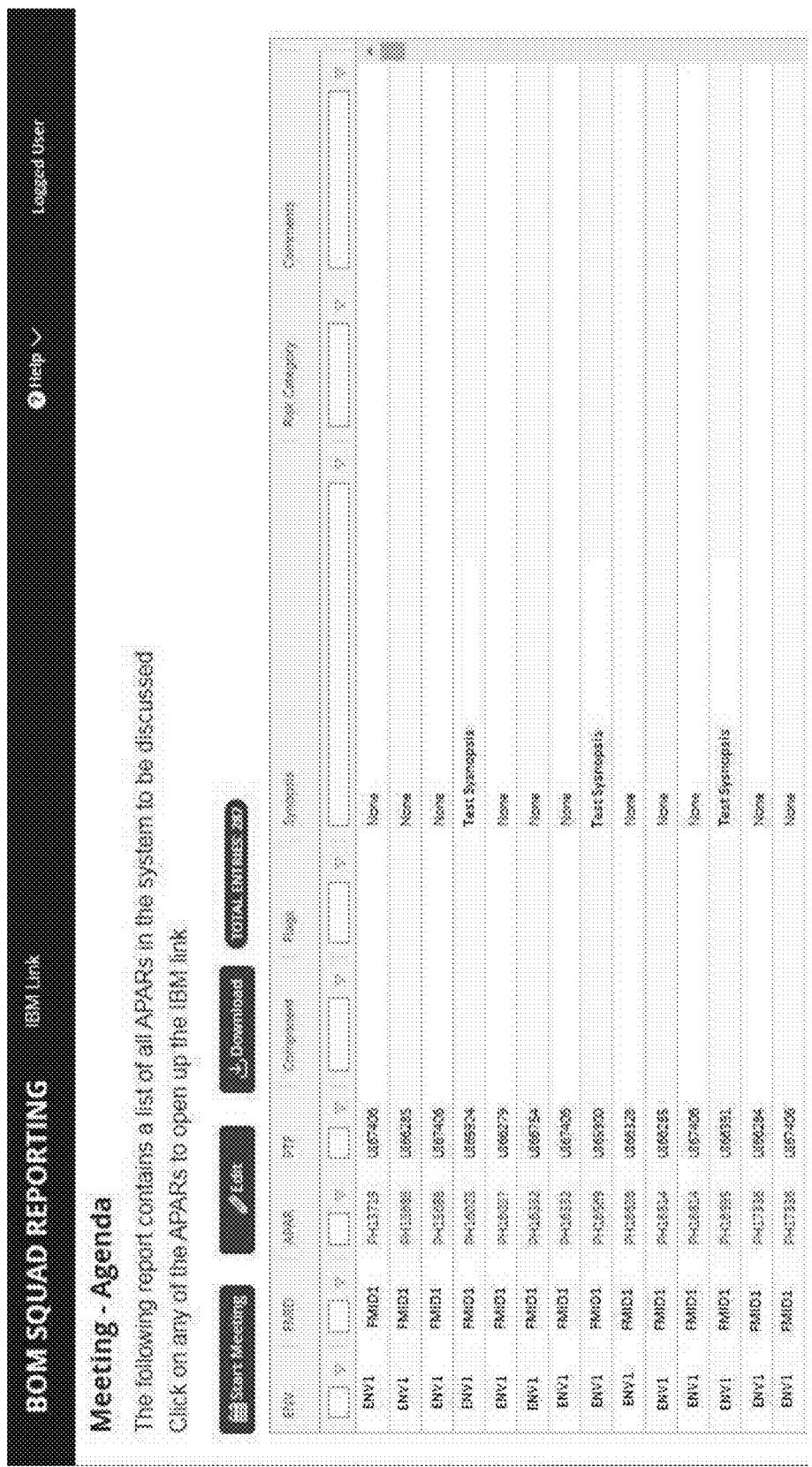
FIG. 17 is a third screenshot that illustrates a user interface of a system for automating a mainframe patch scanning process for verifying that patches for correcting code deficiencies, bugs, and vulnerabilities have been properly installed across various computer network environments, according to an exemplary embodiment.

FIG. 17 is a third screenshot 1700 that illustrates a user interface of a system for automating a mainframe patch scanning process for verifying that patches for correcting code deficiencies, bugs, and vulnerabilities have been properly installed across various computer network environments, according to an exemplary embodiment. Screenshot 1700 illustrates a meeting agenda page that includes details of APARs to be discussed as part of a meeting agenda.

Figure 18:
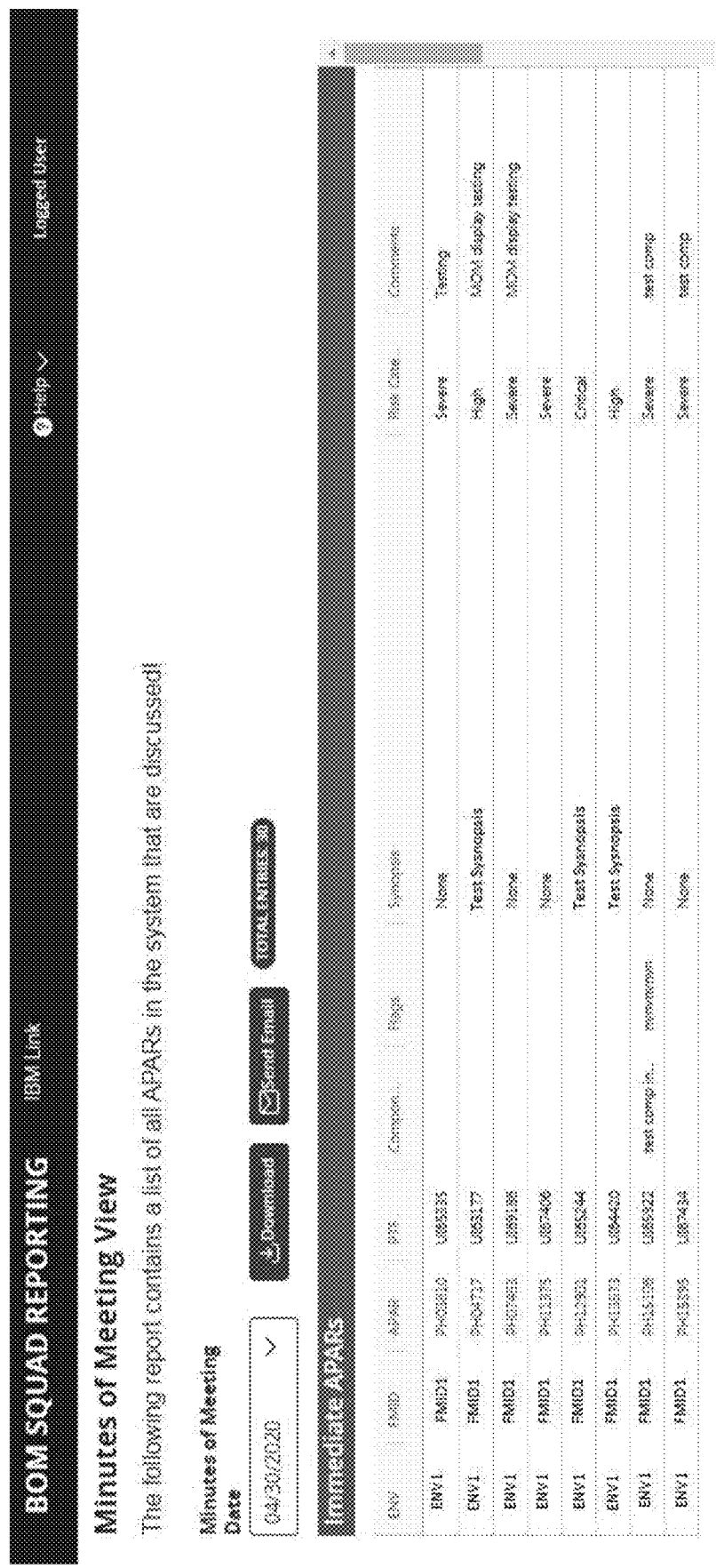
FIG. 18 is a fourth screenshot that illustrates a user interface of a system for automating a mainframe patch scanning process for verifying that patches for correcting code deficiencies, bugs, and vulnerabilities have been properly installed across various computer network environments, according to an exemplary embodiment.

FIG. 18 is a fourth screenshot 1800 that illustrates a user interface of a system for automating a mainframe patch scanning process for verifying that patches for correcting code deficiencies, bugs, and vulnerabilities have been properly installed across various computer network environments, according to an exemplary embodiment. Screenshot 1800 illustrates a minutes of meeting reporting view which displays minutes of meetings that have been completed. The page also includes a drop-down menu of selectable dates for displaying meeting minutes.

Figure 19:
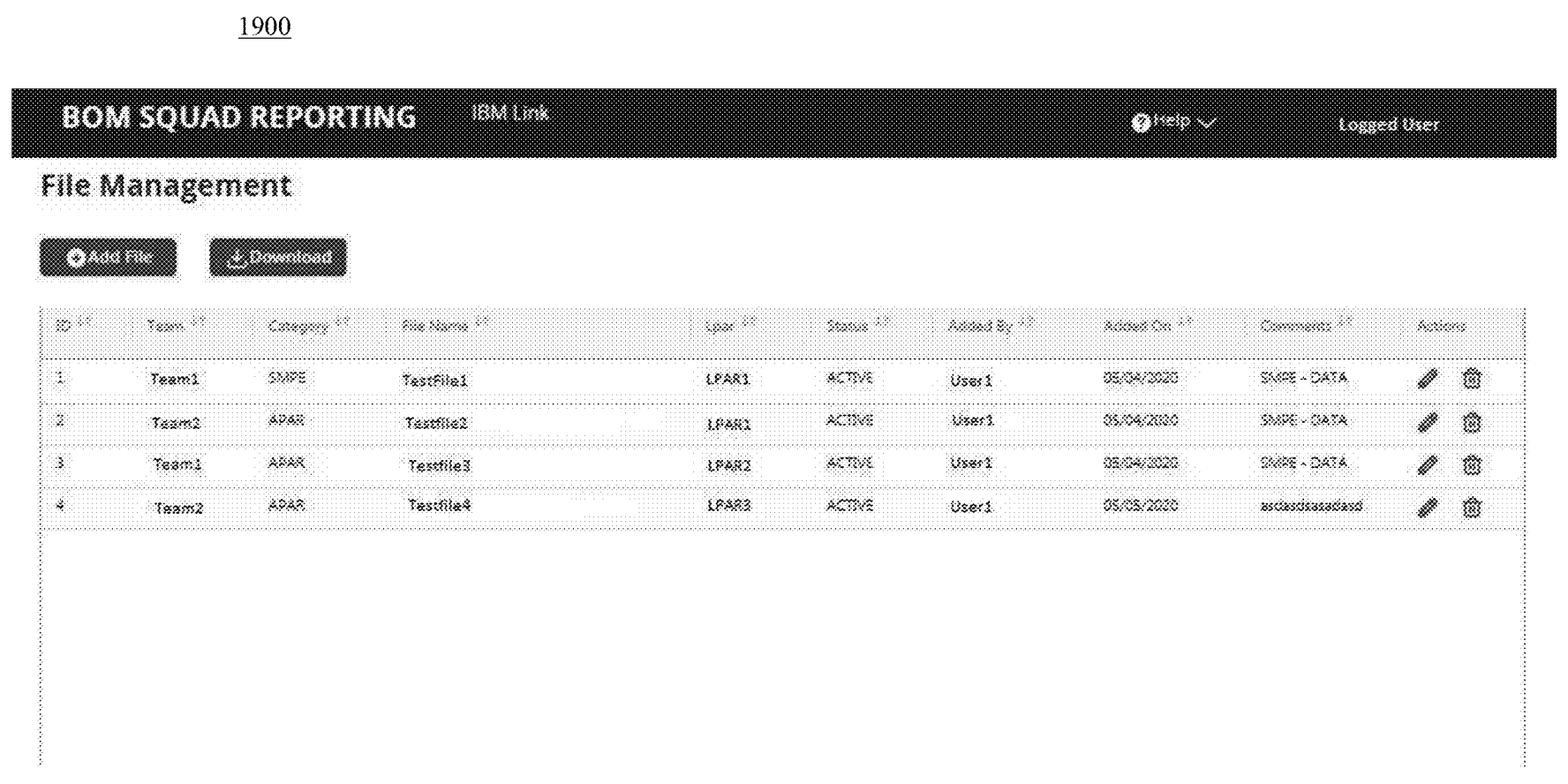

FIG. 19 is a fifth screenshot 1900 that illustrates a user interface of a system for automating a mainframe patch scanning process for verifying that patches for correcting code deficiencies, bugs, and vulnerabilities have been properly installed across various computer network environments, according to an exemplary embodiment. Screenshot 1900 illustrates a file management page which displays a list of files at various stages of a process for loading and/or updating data into the system.

Figure 20:
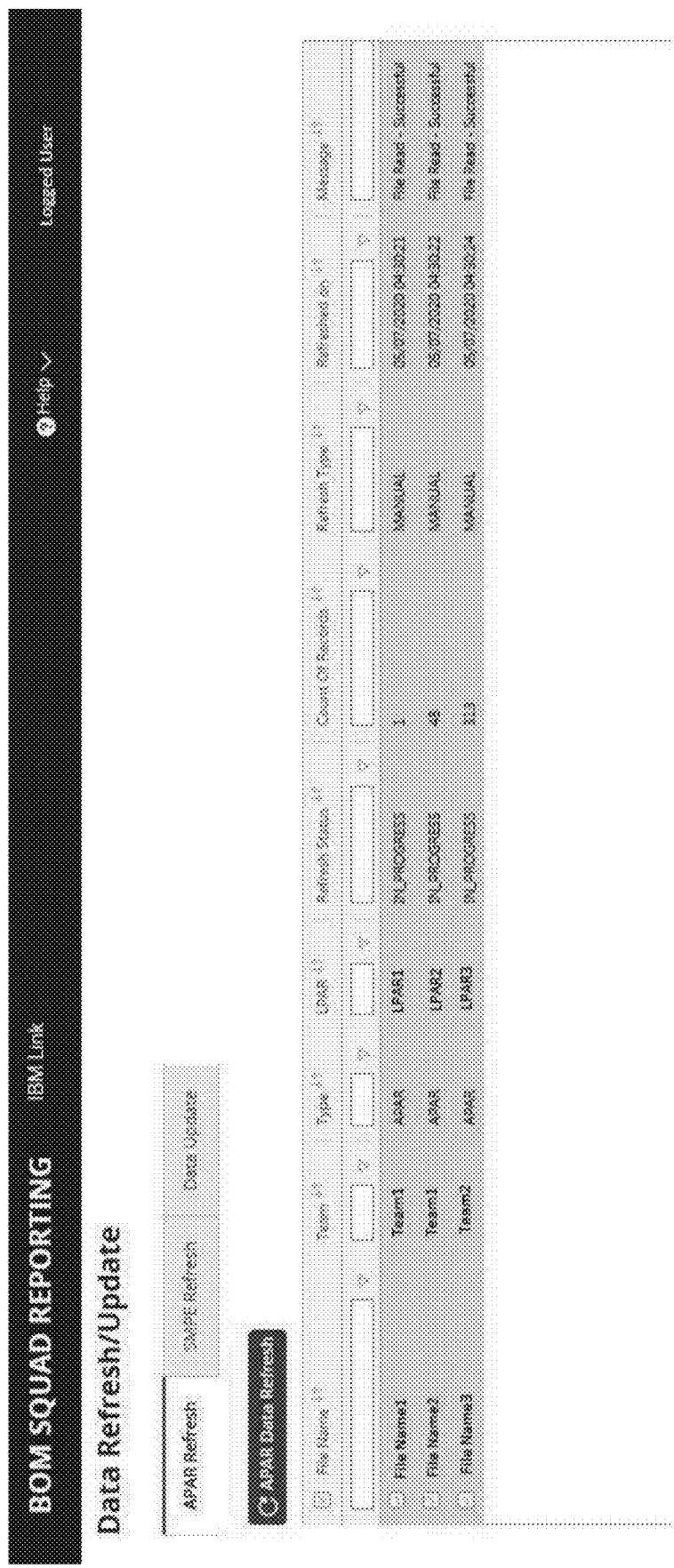
FIG. 20 is a sixth screenshot that illustrates a user interface of a system for automating a mainframe patch scanning process for verifying that patches for correcting code deficiencies, bugs, and vulnerabilities have been properly installed across various computer network environments, according to an exemplary embodiment.

FIG. 20 is a sixth screenshot 2000 that illustrates a user interface of a system for automating a mainframe patch scanning process for verifying that patches for correcting code deficiencies, bugs, and vulnerabilities have been properly installed across various computer network environments, according to an exemplary embodiment. Screenshot 2000 illustrates a data refresh/update page which displays processing details of the files displayed in the file management page of FIG. 19.

Figure 21:
FIG. 21 is a seventh screenshot that illustrates a user interface of a system for automating a mainframe patch scanning process for verifying that patches for correcting code deficiencies, bugs, and vulnerabilities have been properly installed across various computer network environments, according to an exemplary embodiment.

FIG. 21 is a seventh screenshot 2100 that illustrates a user interface of a system for automating a mainframe patch scanning process for verifying that patches for correcting code deficiencies, bugs, and vulnerabilities have been properly installed across various computer network environments, according to an exemplary embodiment. Screenshot 2100 illustrates a critical patch management (CPM) reporting view which displays details of APARs together with scan details and OLA details of PTFs.

Figure 22:
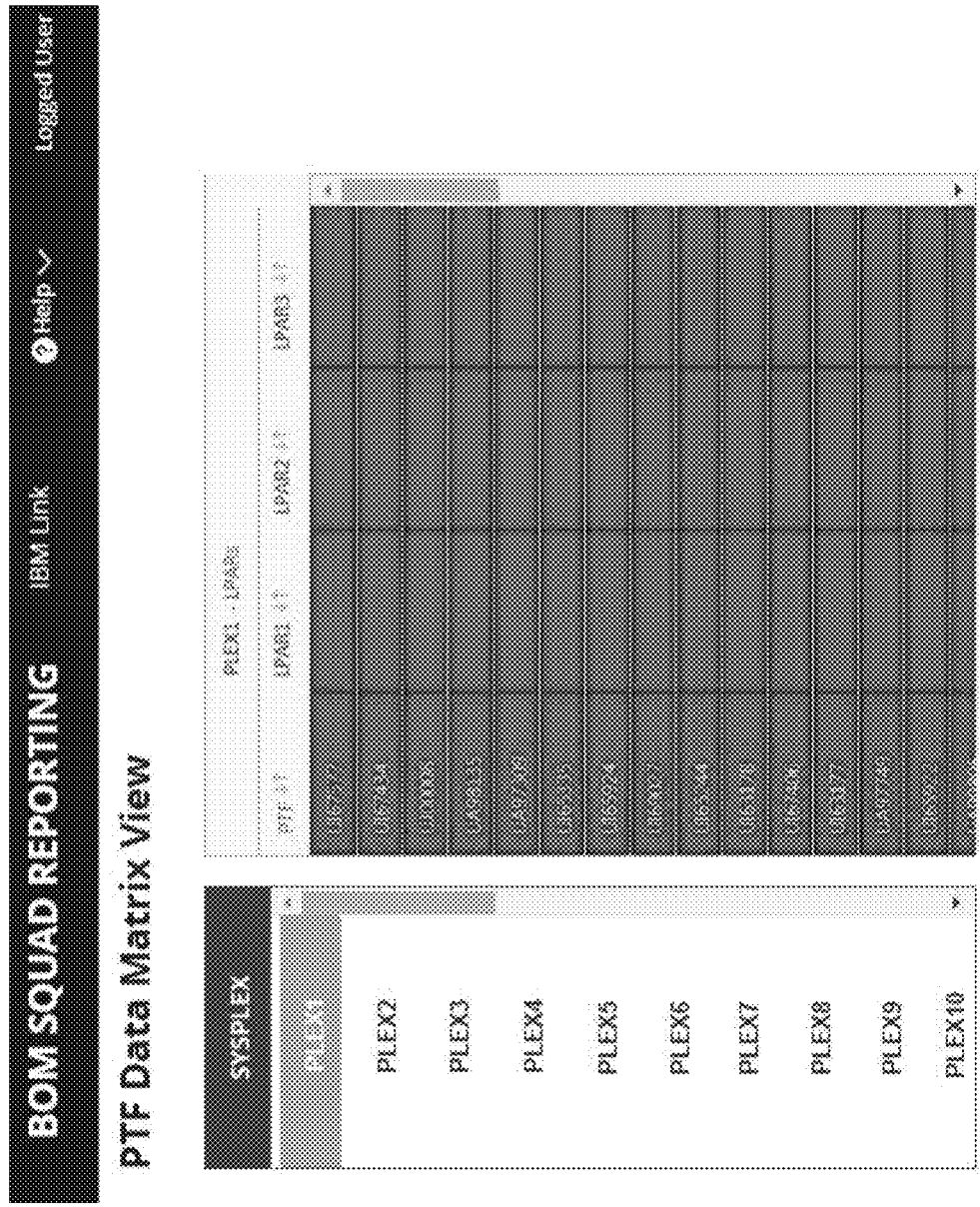
FIG. 22 is an eighth second screenshot that illustrates a user interface of a system for automating a mainframe patch scanning process for verifying that patches for correcting code deficiencies, bugs, and vulnerabilities have been properly installed across various computer network environments, according to an exemplary embodiment.

FIG. 22 is an eighth second screenshot 2200 that illustrates a user interface of a system for automating a mainframe patch scanning process for verifying that patches for correcting code deficiencies, bugs, and vulnerabilities have been properly installed across various computer network environments, according to an exemplary embodiment. Screenshot 2200 illustrates a PTF data matrix view which displays scan details of all PTFs across all systems sysplex-wise in a matrix view.

FIG. 23 is a ninth screenshot 2300 that illustrates a user interface of a system for automating a mainframe patch scanning process for verifying that patches for correcting code deficiencies, bugs, and vulnerabilities have been properly installed across various computer network environments, according to an exemplary embodiment. Screenshot 2300 illustrates a PTF search view which enables a user to search for a specific PTF and displays scan details across all mainframe systems for the searched PTF.

Accordingly, with this technology, an optimized process for automating a mainframe patch scanning process for verifying that patches for correcting code deficiencies, bugs, and vulnerabilities have been properly installed across various computer network environments for tracking and operational continuity purposes is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for maintaining software within a mainframe computing apparatus, the method being implemented by at least one processor, the method comprising:
   receiving, by the at least one processor, at least one software module;
   determining, by the at least one processor based on at least one risk attribute assigned to the received at least one software module, a criticality for the at least one software module;
   deploying, by the at least one processor, the received at least one software module to at least one destination within the mainframe computing apparatus based on the determined criticality;
   scanning, by the at least one processor, at least one mainframe logical partition within which the at least one software module is intended to be installed;
   determining, by the at least one processor, whether the at least one software module has been installed based on a result of the scanning;
   retrieving, by the at least one processor, based on the determined criticality, an operating level agreement that is applicable to the at least one software module;
   determining, by the at least one processor, based on the retrieved operating level agreement, for each respective one of at least one mainframe logical partition within which the at least one software module is intended to be installed, whether an installation of the at least one software module has occurred before a corresponding target installation day of a specified month that is based on the operating level agreement; and
   based on whether the installation of the at least one software module has occurred before a corresponding target installation day of a specified month that is based on the operating level agreement, determining whether the operating level agreement has been violated.

2. The method of claim 1, further comprising:
   displaying a user interface that includes information that relates to the at least one software module; and
   after the data indicating whether the at least one software module has been installed is obtained, updating the user interface to include information that indicates an installation status of the at least one software module.

3. The method of claim 2, wherein the information that indicates the installation status of the at least one software module is provided as a color-coded cell within a table displayed within the user interface, and wherein the table includes a first color indicating a proper installation of the at least one software module, a second color indicating that the at least one software module has not been installed and that the operating level agreement has not been violated, and at least a third color indicating that the at least one software module has not been installed and that the operating level agreement has been violated.

4. The method of claim 3, further comprising:
   performing, based on a predetermined periodic schedule, a refresh process that includes repeating the obtaining of the data indicating whether the at least one software module has been installed, repeating the updating of the user interface to include the information that indicates the installation status of the at least one software module, and repeating the determining of whether the operating level agreement has been violated; and
   alerting a user about an updated installation status of the at least one software module based on a result of the refresh process.

5. The method of claim 2, wherein the information that indicates the installation status of the at least one software module includes date information indicating a date on which each of the at least one software module was installed.

6. The method of claim 2, further comprising determining, based on a result of the scanning, whether an installation of the at least one software module has caused a program error, and when a determination is made that the program error has been caused, performing an additional scan in order to identify at least one system within the mainframe computing apparatus that is exposed to the program error.

7. The method of claim 2, wherein the user interface includes a drop-down menu of selectable dates for displaying minutes of meetings that have been completed.

8. The method of claim 1, wherein the at least one software module comprises a software patch that corrects at least one from among: code deficiencies and software bugs.

9. A computing device for maintaining software within a mainframe computing apparatus, the computing device comprising:
   a processor;
   a display;
   a memory; and
   a communication interface coupled to each of the processor, the display, and the memory, wherein the processor is configured to:
receive, via the communication interface, at least one software module;
determine, based on at least one risk attribute assigned to the received at least one software module, a criticality for the at least one software module;
deploy the received at least one software module to at least one destination within the mainframe computing apparatus based on the determined criticality;
scan at least one mainframe logical partition within which the at least one software module is intended to be installed;
determine whether the at least one software module has been installed based on a result of the scanning;
retrieve, based on the determined criticality, an operating level agreement that is applicable to the at least one software module;
determine, based on the retrieved operating level agreement, for each respective one of at least one mainframe logical partition within which the at least one software module is intended to be installed, whether an installation of the at least one software module has occurred before a corresponding target installation day of a specified month that is based on the operating level agreement; and
based on whether the installation of the at least one software module has occurred before a corresponding target installation day of a specified month that is based on the operating level agreement, determine whether the operating level agreement has been violated.

10. The computing device of claim 9, wherein the processor is further configured to:
cause the display to display a user interface that includes information that relates to the at least one software module; and
after the data indicating whether the at least one software module has been installed is obtained, update the user interface to include information that indicates an installation status of the at least one software module.

11. The computing device of claim 10, wherein the information that indicates the installation status of the at least one software module is provided as a color-coded cell within a table displayed within the user interface, and wherein the table includes a first color indicating a proper installation of the at least one software module, a second color indicating that the at least one software module has not been installed and that the operating level agreement has not been violated, and at least a third color indicating that the at least one software module has not been installed and that the operating level agreement has been violated.

12. The computing device of claim 11, wherein the processor is further configured to:
perform, based on a predetermined periodic schedule, a refresh process that includes repeating the obtaining of the data indicating whether the at least one software module has been installed, repeating the updating of the user interface to include the information that indicates the installation status of the at least one software module, and repeating the determining of whether the operating level agreement has been violated; and
alert a user about an updated installation status of the at least one software module based on a result of the refresh process.

13. The computing device of claim 10, wherein the information that indicates the installation status of the at least one software module includes date information indicating a date on which each of the at least one software module was installed.

14. The computing device of claim 10, wherein the processor is further configured to:
determine, based on a result of the scanning, whether an installation of the at least one software module has caused a program error; and
when a determination is made that the program error has been caused, perform an additional scan in order to identify at least one system within the mainframe computing apparatus that is exposed to the program error.

15. The computing device of claim 10, wherein the user interface includes a drop-down menu of selectable dates for displaying minutes of meetings that have been completed.

16. The system of claim 9, wherein the at least one software module comprises a software patch that corrects at least one from among: code deficiencies and software bugs.

17. A non-transitory computer readable storage medium storing instructions for maintaining software within a mainframe computing apparatus, the storage medium comprising executable code which, when executed by a processor, causes the processor to:
receive at least one software module;
determine, based on at least one risk attribute assigned to the received at least one software module, a criticality for the at least one software module;
deploy the received at least one software module to at least one destination within the mainframe computing apparatus based on the determined criticality;
scan at least one mainframe logical partition within which the at least one software module is intended to be installed;
determine whether the at least one software module has been installed based on a result of the scanning;
retrieve, based on the determined criticality, an operating level agreement that is applicable to the at least one software module;
determine, based on the retrieved operating level agreement, for each respective one of at least one mainframe logical partition within which the at least one software module is intended to be installed, whether an installation of the at least one software module has occurred before a corresponding target installation day of a specified month that is based on the operating level agreement; and
based on whether the installation of the at least one software module has occurred before a corresponding target installation day of a specified month that is based on the operating level agreement, determine whether the operating level agreement has been violated.

18. The non-transitory computer readable storage medium of claim 17, wherein the executable code is further configured to cause the processor to:
display a user interface that includes information that relates to the at least one software module; and
after the data indicating whether the at least one software module has been installed is obtained, update the user interface to include information that indicates an installation status of the at least one software module.

19. The non-transitory computer readable storage medium of claim 18, wherein the user interface includes a drop-down menu of selectable dates for displaying minutes of meetings that have been completed.

20. The non-transitory computer readable storage medium of claim 17, wherein the at least one software module comprises a software patch that corrects at least one from among: code deficiencies and software bugs.

\* \* \* \* \*